April 9, 1946.  J. R. ALBERS ET AL  2,398,273
AIR CIRCULATING AND TEMPERATURE CONTROL DEVICE FOR REFRIGERATOR CARS
Filed June 29, 1942  2 Sheets-Sheet 1

INVENTORS
John R. Albers
Maurice M. Lasensky
BY Sam J. Shotsky
ATTORNEY

April 9, 1946.　　J. R. ALBERS ET AL　　2,398,273
AIR CIRCULATING AND TEMPERATURE CONTROL DEVICE FOR REFRIGERATOR CARS
Filed June 29, 1942　　2 Sheets-Sheet 2
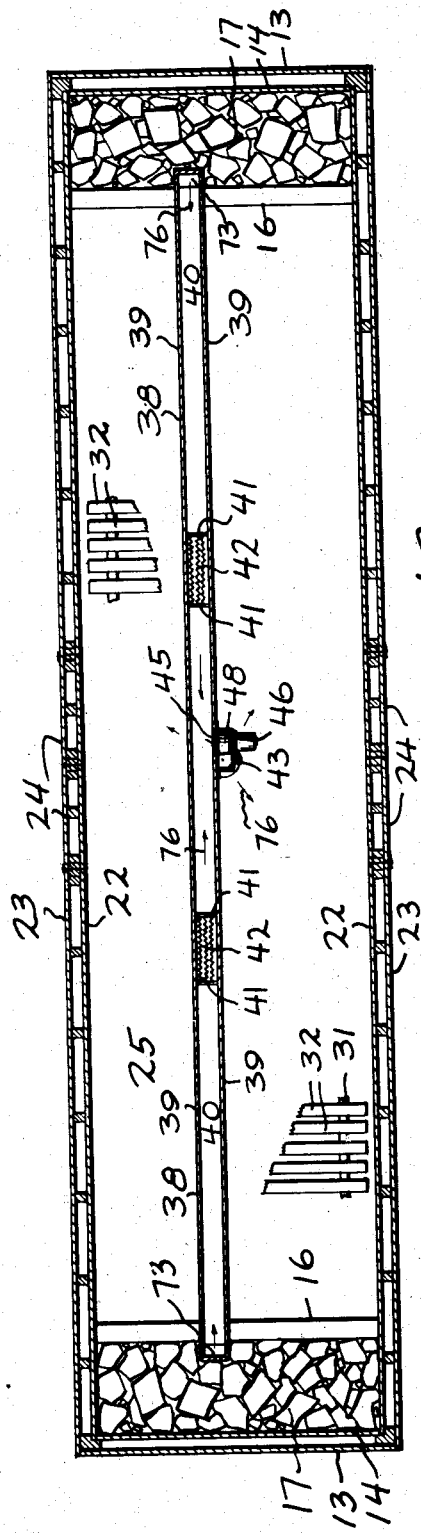
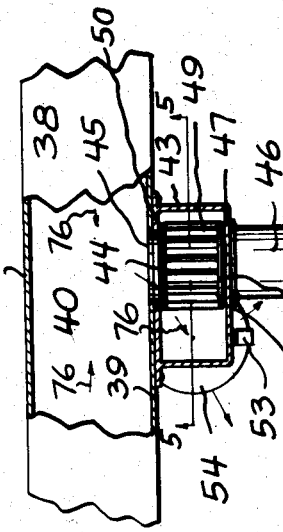
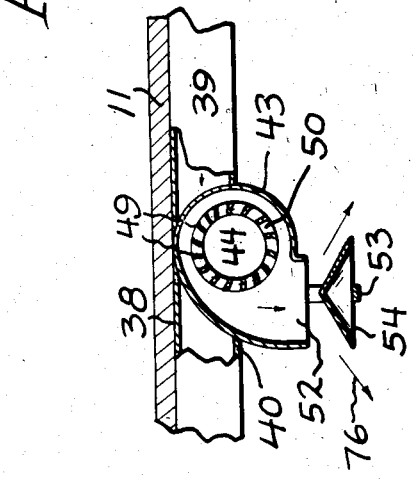
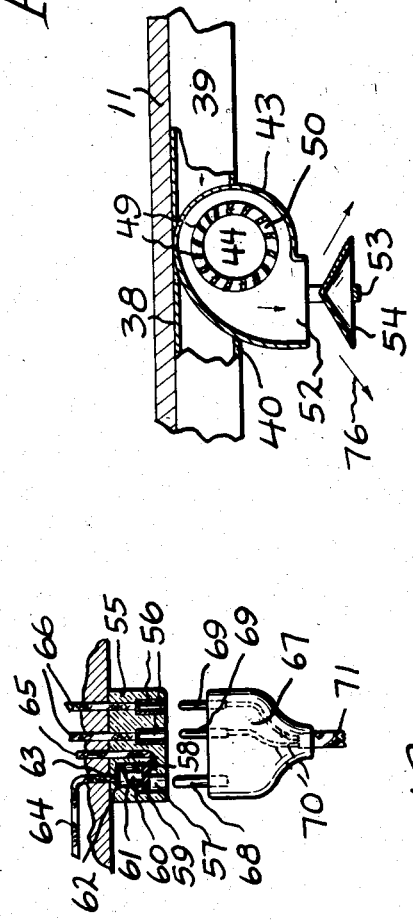
INVENTORS
John R. Albers
Maurice M. Lasensky
BY
Sam J. Slotky
ATTORNEY Patented Apr. 9, 1946

2,398,273

UNITED STATES PATENT OFFICE 2,398,273

AIR CIRCULATING AND TEMPERATURE CONTROL DEVICE FOR REFRIGERATOR CARS

John R. Albers and Maurice M. Lasensky, Sioux City, Iowa, assignors to Wincharger Corporation, Sioux City, Iowa, a corporation of Minnesota Application June 29, 1942, Serial No. 448,998

4 Claims. (Cl. 257—3)

Our invention relates to vehicles, and more particularly to such vehicles in which arrangements are provided for keeping goods carried therein at a substantially constant temperature.

An object of our invention is to provide in such a vehicle a highly efficient circulating system of a new and improved type for maintaining perishable products at a desired temperature, whether it is desired to maintain such products at a temperature either higher or lower than that of air surrounding the vehicle.

A further object of our invention is to provide a new and improved electrically operated arrangement which functions to maintain substantially constant temperature inside such a vehicle as it is in motion, which auxiliary means for maintaining the electrical arrangement in operation when the car is stationary.

A further object of our invention is to provide a new and improved circulating blower and duct system in combination with the ice containing bunkers of a refrigerator car to provide air circulation even though the blower and duct system should fail.

A further object of our invention is to provide a new and improved automatic disconnecting arrangement for disconnecting the driven generator of such a vehicle when the electric circuits of the vehicle are connected to a main electric supply system.

Figure 2:
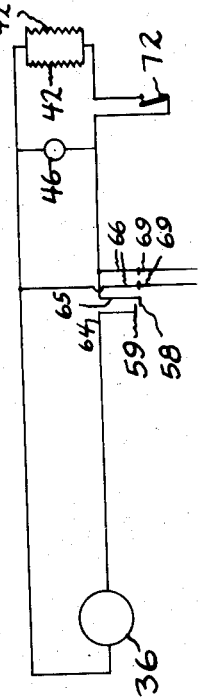
Figure 1:
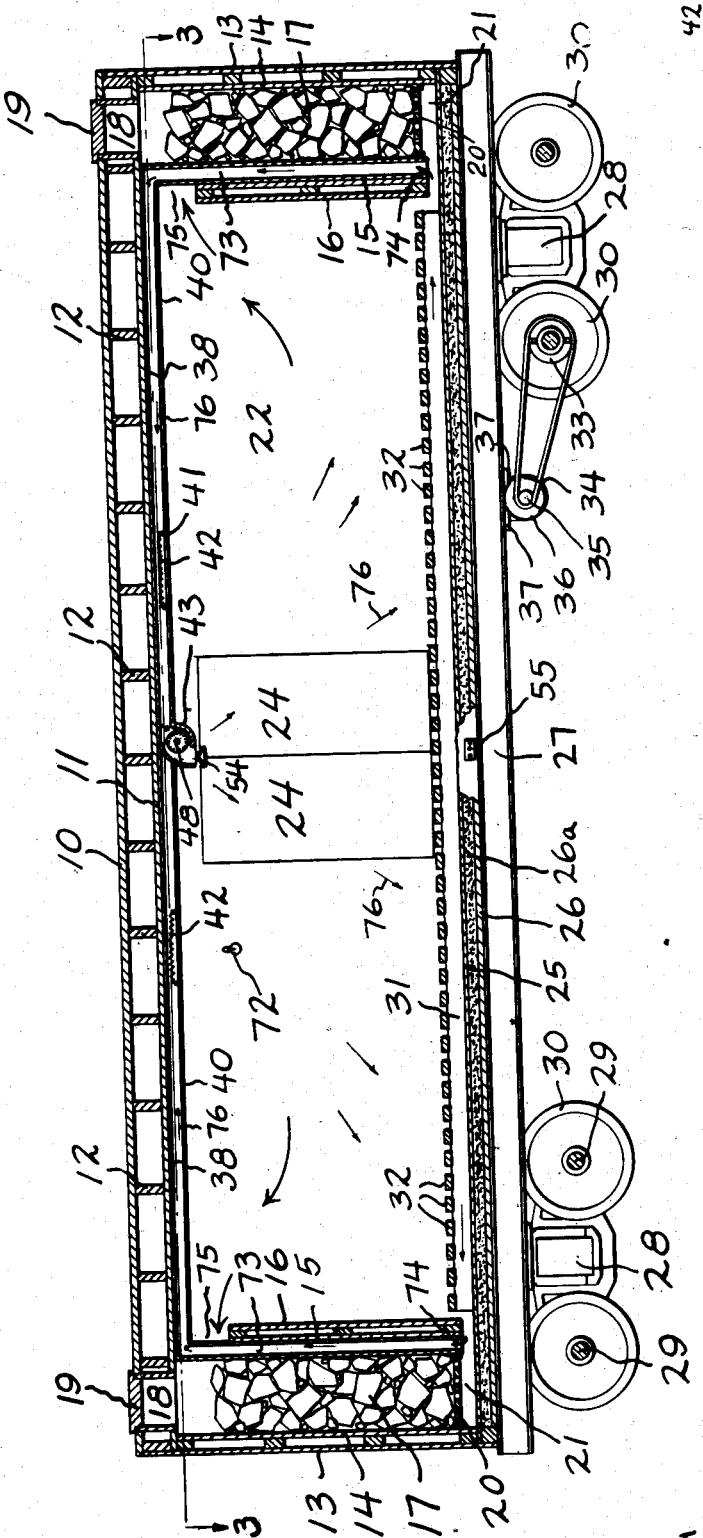

The features of our invention which we believe to be novel are set forth with particularity in the appended claims. My invention itself, both as to its organization and manner of operation, together with further objects and advantages thereof may best be understood by reference to the following description taken in connection with the accompanying drawings in which:

Figure 1 is a sectional view taken along the length of a refrigerator railway car embodying our invention, Figure 2 is a diagram of the electric circuit of the car of Figure 1, Figure 3 is a sectional plan view taken substantially along the lines 3—3 of Figure 1, Figure 4 is a detail of a connecting plug useful in connection with the circuit of Figure 2, Figure 5 is an enlarged detail of a fan or blower arrangement as taken along the lines 5—5 of Figure 6, and Figure 6 is a fragmentary section of a plan view of Figure 5.

In Figure 1 a refrigerator car is illustrated which includes a roof 10, an inner roof wall 11, spaced from the wall 10 by joists 12 forming a dead air space between the roof 10 and the inner roof wall 11. Suitable insulation may, if desired, be placed in the dead air space between the roof 10 and the roof wall 11. The refrigerator car also includes outer end walls 13 and inner end walls 14 between which a dead air space is provided, which, if desired, may also be filled with insulation. Additional spaced walls 15 and 16 are provided with a dead air space, or insulation, therebetween. These walls 15 and 16 are spaced from and parallel with the inner end wall 14 at each end of the car. The space between the inner end wall 14 and the adjacent wall 15, spaced therefrom but lying parallel thereto, forms an ice bunker within which ice 17 is placed. A hatch 18 is provided through the roof 10 and inner roof wall 11 to allow ice 17 to be placed within the ice bunker. A lid 19 is provided to cover the hatch 18 through the roof 10.

The ice in the ice bunker rests upon a perforated platform 20 with a space 21 being provided below the platform 20. The refrigerator car also includes the insulated inner side-walls 22 spaced from the outer side walls 23, and the hinged centrally arranged insulated doors 24, as may be best seen in Figure 3. The bottom wall, or floor, 25 of the car is spaced from the lower floor 26 with insulation 26a therebetween and with the floor 26 resting on the longitudinal beams 27 which are attached to and supported by the carriages 28. Carriages 28 are journaled upon the axles 29 carrying wheels 30. Resting on the bottom wall 25 is a grating structure comprising the longitudinal beams 31 and the cross-members 32 attached thereto.

One of the axles 29 carries a split pulley 33 which drives a belt 34 which in turn drives the pulley 35 attached to the shaft of an electric generator 36 supported at 37 on a beam 27. Attached to the inner roof 11 is a duct 38 having the side-walls 39 and bottom wall 40 which duct is preferably attached substantially centrally to the roof 11, or at a slight distance off of the center thereof. Attached to the insulating members 41 which are positioned within the ducts 38 are resistors or heating coils 42. Attached near the center of the duct 38 is a blower housing 43 which is attached at one side of the duct to one of the walls 39 thereof, the casing 43 including an opening 44 registering with an opening 45 formed in the duct wall 39.

Attached to the casing 43 is an electric motor 46 the shaft 47 of which is attached to the blower member 48 having the blades 49 attached to the end ring 50 the opening of which registers with the openings 44 and 45. The shaft 47 is attached to the disc 51. The housing 43 includes the discharge end 52 to which is attached a supporting bracket 53 which supports the conical member 54 which is spaced from the end of the nozzle 52.

Attached at a lower portion of the refrigerator car is a female plug member 55 (see Figures 1 and 4) which includes a pair of female contact sockets 56 and an opening 57. Embedded within the member 55, which is made of insulating material, is a contact member 58 against which bears a further contact member 59 having an extension 60 which is received within a compression spring 61 received within a cavity 62 with the compression spring 61 bearing against a further contact member 63. Attached to the member 63 is an insulated wire lead 64, and attached to the member 58 is a lead 65, and attached to the members 56 are leads 66.

A male plug member 67 is formed of insulating material and has embedded therein a projecting cylindrical rod 68, and also attached within the member 67 are the male contacts 69 which are connected through leads 70 to a twin wire cord 71. Attached to one of the walls of the car is a thermostat contact member 72 (Figure 1) which can be set to close its contacts at any predetermined temperature.

In order to complete the duct circuit, we provide a pair of vertical duct members 73 which communicate with the ducts 38 and which extend downwardly to openings 74 which communicate with the space 21. The walls 16 terminate below the lower roof 11 and duct 38 to leave the openings 75 providing an air circulating path between the main car body and the upper portion of the ice bunker holding the ice 17.

As the car moves, rotation of the wheel 30 drives the pulley 33 which in turn drives the generator 36 which excites the electric circuit shown in Figure 2 and correspondingly drives the fan motor 46 and heats the resistor or heating elements 42. The direction of air circulation is substantially as shown in Figure 1 by the arrows 76, the air being blown downwardly through the discharge end 52 of the blower and dispersed over the member 54 from where it is distributed through and over the products in the car to travel downwardly and under the grating 32 and thence up through the ducts 73 back to the fan blower 46 where such cycle is again repeated. This air, heated by the goods in the car, also travels upwardly toward the openings 75 above the ice bunkers and then by gravity flows downwardly through the ice 17 to the space 21 where it joins the air coming through grating 32 and flows into the duct 73. This provides a circulation from the center of the car outwardly toward the ends. When it is desired to keep perishable products at a low temperature, the thermostat being set for such temperature, normally the heating coils are disconnected by the thermostat and the circulation takes place as stated with the ice 17 about the vertical ducts 73 extracting heat from the duct and cooling down the air and also extracting heat from the air flowing through the ice 17 so that the necessary temperature is maintained. Since the thermostat is set to guard against undue low temperatures, when the temperature drops below a predetermined temperature the thermostat contacts close and produce current flow through the heating elements 42 whereby the passage of the air thereover brings the air to the desired predetermined temperature.

In cases were it is desirable to maintain perishable products at a higher temperature than the temperature of air surrounding the car, and in some cases without the use of the ice, the resistors 42 operate to warm the air to the predetermined temperature, the same sort of air circulation through the ducts 72 and 38 and the blower 43 being maintained. The fan 46 is mounted centrally on the duct 38 and draws the air from both directions to the center of the car and thence draws the air stream through the openings 44 and 45 where it is then blown downwardly through the discharge end 52. The central position of the blower exhaust in the car provides an added advantage inasmuch as the temperature conditioned air is exhausted into the car effectively at the regions near the side doors where ordinarily the greatest spoilage occurs, since those regions are most difficult to insulate from changes of temperature of the air surrounding the car.

Frequently a refrigerator car is stationary, as at stations, or at the places where the ice supply is replenished, in which instances the plug members 55 and 67 are employed. The plug 67 through the leads 70 is connected to a main electric supply circuit at the station, and when the plug male elements 69 are forced into the female sockets 56 an electric power supply circuit is established to supply electric energy to the entire arrangement comprising the motor 46, and the heater coils 42, and at the same time the rod 68 which is longer than the male contacts 69 bears against the contact member 59 and carries it away from the contact 58 thereby breaking the circuit to the generator 36, it being naturally necessary to disconnect this latter circuit for obvious reasons. Just before the car is placed in motion again, the plug 67 is withdrawn and the arrangement then functions as before.

The circulation of the air through the car is at its greatest efficiency when the air passes through the duct work. However in case of failure of the fan or generator, there is produced a natural circulation of air flowing by force of gravity downwardly through the ice 17 as before and upwardly through grating 32 and the goods in the car and through the upper opening 75 back into the ice 17.

While we have shown and described the particular embodiments of our invention, it will be obvious to those skilled in the art that changes and modifications may be made without departing from our invention in its broader aspects, and we, therefore, aim in the appended claims to cover all such changes and modifications as fall within the true spirit and scope of our invention.

We claim as our invention:

1. In combination with a refrigerator car having end refrigerant bunkers, an air duct communicating with said bunkers and positioned on the ceiling of the car, an air forcing unit attached substantially centrally to said duct to provide a double circulation in said car of air from the center of the car toward said bunkers, and thence through said bunkers and back through said duct to said center of said car, means for heating air within said duct, means responsive to predetermined temperatures in said car for operating said heating means, said duct including vertical end extensions passing downwardly to a lower part of said bunkers, said lower part of said bunkers being in communication with the floor portions of said car, electric circuit means for energizing said air forcing means and said heating means including an electric generator driven by the wheels of said car, and means for disconnecting said generator from said air forcing and heating means and for simultaneously connecting an outside circuit with said electric circuit by manual control when said car is stationary.

2. In combination with a refrigerator car having end refrigerant bunkers, an air duct providing communication between the lower parts of said bunkers and parts of said car near the center thereof, said duct being positioned on the ceiling of the car at parts of said car spaced from said bunkers, means for forcing air through said duct from said lower parts of said bunkers to said parts of said car near the center thereof where air is discharged to flow toward the ends of said car and said bunkers, means for heating air within said duct, means responsive to predetermined temperatures in said car for operating said heating means, electric circuit means for energizing said air forcing means and said heating means including an electric generator driven by the wheels of said car, means for disconnecting said generator from said circuit means and for simultaneously connecting an outside circuit with said circuit means by manual control when said car is stationary, said last means including a female socket member having a pair of fixed female contacts and a further contact connected to said air forcing and heating means and a spring urged contact connected to said generator and normally urged against said further contact, and a male plug member including a pair of male contacts and connected to an outside circuit, said male plug member having means incorporated therein arranged to move said spring urged contact from said further contact upon insertion of said male contact into said female contact.

3. In a vehicle having a closed elongated compartment insulated against heat transfer through the walls thereof and having at least one door near the center of said compartment, the insulation of said compartment against such heat transfer being relatively less adjacent said door than elsewhere, an air temperature conditioning chamber within each of the opposite ends of said compartment, an air duct within said compartment extending from the lower end of each of said chambers to a single point in the upper part of said compartment adjacent said door, and a single air blower connected with both of said ducts at said single point and arranged to draw temperature conditioned air through said duct from each of said chambers, said blower having an air outlet arranged to exhaust temperature conditioned air downwardly directly toward said door whereby temperature changes near said door because of such relatively less insulation therearound are offset, at least in part, by the exhaust of temperature conditioned air towards said door.

4. In a vehicle having a closed elongated compartment insulated against heat transfer through the walls thereof and having at least one door near the center of said compartment, the insulation of the walls in said compartment against heat transfer being relatively less adjacent said door, an air temperature conditioning chamber within each of the opposite ends of said compartment, each of said chambers having two vertically spaced openings communicating with the remainder of said compartment, an air duct within said compartment extending from a point adjacent the lower opening of each of said chambers to a single point in the upper part of said compartment adjacent said door, and a single air blower connected with both said ducts at said single point and arranged to draw temperature conditioned air through said duct from each of said chambers, said blower having an air outlet arranged to exhaust temperature conditioned air downwardly directly toward said door whereby temperature changes near said door because of the relatively smaller insulation of said walls adjacent said door are offset at least in part by the exhaust of temperature conditioned air toward said door, and whereby, upon failure of said blower to draw air through said duct, temperature conditioned air circulates through said openings in said chambers by convection.

JOHN R. ALBERS.
MAURICE M. LASENSKY.